United States Patent [19]

Kobayashi et al.

[11] Patent Number: 4,748,081
[45] Date of Patent: May 31, 1988

[54] MAGNETIC RECORDING MEDIUM HAVING AN IMPROVED MAGNETIC LAYER USING PARTICULATE ALPHA-FE₂O₃ AND CARBON BLACK

[75] Inventors: Osamu Kobayashi; Yukio Matsumoto; Hitoshi Takita; Mutsumu Kurihara; Tsunehide Naruse, all of Mito, Japan

[73] Assignee: Victor Company of Japan, Ltd., Japan

[21] Appl. No.: 831,796

[22] Filed: Feb. 21, 1986

[30] Foreign Application Priority Data

Feb. 23, 1985 [JP] Japan .................................. 60-33662
Feb. 23, 1985 [JP] Japan .................................. 60-33663

[51] Int. Cl.⁴ ............................................ G11B 5/702
[52] U.S. Cl. .................................. 428/329; 427/128; 428/694; 428/900
[58] Field of Search ............... 428/328, 329, 694, 900; 427/128

[56] References Cited

U.S. PATENT DOCUMENTS 4,363,850 12/1982 Yasui et al. ..................... 428/694
4,425,400  1/1984 Yamaguchi et al. ............. 428/694
4,499,121  2/1985 Yamaguchi et al. ............. 427/128
4,551,386 11/1985 Yamaguchi et al. ............. 427/128

Primary Examiner—Paul J. Thibodeau
Attorney, Agent, or Firm—Lowe, Price, LeBlanc, Becker & Shur

[57] ABSTRACT

A magnetic recording medium of the type comprising a non-magnetic substrate and a magnetic recording layer formed on at least one side of the substrate. The magnetic recording layer comprises particulate alpha-Fe₂O₃ and carbon black as additives dispersed in a resin binder along with a magnetic powder. These additives serve to improve magnetic characteristics and a ilght-shielding property. When vinyl chloride-vinyl alcohol copolymers are used as the binder, further improvements are achieved.

7 Claims, 4 Drawing Sheets

MAGNETIC RECORDING MEDIUM HAVING AN IMPROVED MAGNETIC LAYER USING PARTICULATE ALPHA-FE$_2$O$_3$ AND CARBON BLACK

BACKGROUND OF THE INVENTION

1. Field of the Invention

This invention relates to magnetic recording mediums such as, for example, magnetic tapes for audio, video and computer service and floppy discs.

2. Description of the Prior Art

In the field of magnetic recording, there is a strong tendency towards high density recording and magnetic recording in a small size and large capacitance. To this end, extensive studies have been made on magnetic powders.

One such study is directed to fine division of magnetic powders. The use of such finely divided powder in a magnetic recording layer has been proposed as being effective in reduction of noises, improvement of a signal-to-noise ratio, and high density recording.

However, several problems are involved in the use of finely divided powders. One problem is that ordinary tape recorders have a tape end detector mechanism in order to detect a tape end of a magnetic recording tape and stop the tape on detection. More particularly, magnetic recording tapes have generally an optically transparent leader tape portion at opposite ends thereof and a magnetic recording layer whose transmission with respect to light having a wavelength of 8000 to 9000 angstrom is low. An optical sensor is used to detect the difference of the light transmission between the magnetic recording layer and the tape end and confirm the tape end portion. However, when finely divided magnetic powder is used, the light transmission of the resulting tape becomes high and thus, malfunction is apt to occur on detection by the tape end detector mechanism.

For solving the malfunction problem of the detector mechanism, there has been proposed a magnetic recording medium which uses large amounts of carbon black incorporated in a magnetic layer. Alternatively, the magnetic recording layer has been made thick. Both recording mediums are intended to decrease the light transmission of the recording layer which is increased by the fine division of magnetic powder.

However, the addition of carbon black in large amounts will bring about a lowering of magnetic characteristics because of the poor dispersability of carbon black in a binder resin. On the other hand, when the layer thickness is increased, the total thickness of the magnetic recording medium becomes large. To keep the total thickness at a given level in this condition, the thickness of a base has to be smaller. This is disadvantageous in that the if the medium is in the form of a tape, the breaking strength and travellability of the tape become poor. It will be noted that if the thickness of the magnetic recording layer is increased while keeping the thickness of a base as is ordinarily used, the total thickness of the magnetic medium increases as much. This inevitably requires a larger space for accomodating the medium. However, this is not practically possible since recording and reproducing apparatus and related devices are standardized and thus, the length of the medium must unfavorably be shortened.

Moreover, magnetic mediums are brought into frictional contact with magnetic heads when subjected to recording and reproducing operations and particularly at the time of freezing a frame. Accordingly, the magnetic layer has to be highly durable.

SUMMARY OF THE INVENTION

It is therefore an object of the present invention to provide magnetic recording mediums which are suitable for high density recording and have good electromagnetic conversion characteristics and a high light-shielding property.

It is another object of the invention to provide magnetic recording mediums whose magnetic recording layer has good durability.

According to the present invention, there is provided a magnetic recording medium which comprises a non-magnetic substrate and a magnetic layer formed on at least one side of the substrate. The present invention is characterized in that the magnetic recording layer is made of a composition which comprises a resin binder, a magnetic powder, and a mixture of a particulate alpha-Fe$_2$O$_3$ having an average size of from 0.05 to 1 micrometer and carbon black. The magnetic powder and the mixture are uniformly dispersed throughout the resin binder. Although various types of synthetic resins and semi-synthetic resins may be used as the resin binder, vinyl chloride-vinyl alcohol copolymers are preferred because the magnetic powder and the particulate additives are more uniformly dispersed in the copolymers.

DETAILED DESCRIPTION AND EMBODIMENTS OF THE INVENTION

Figure 1:
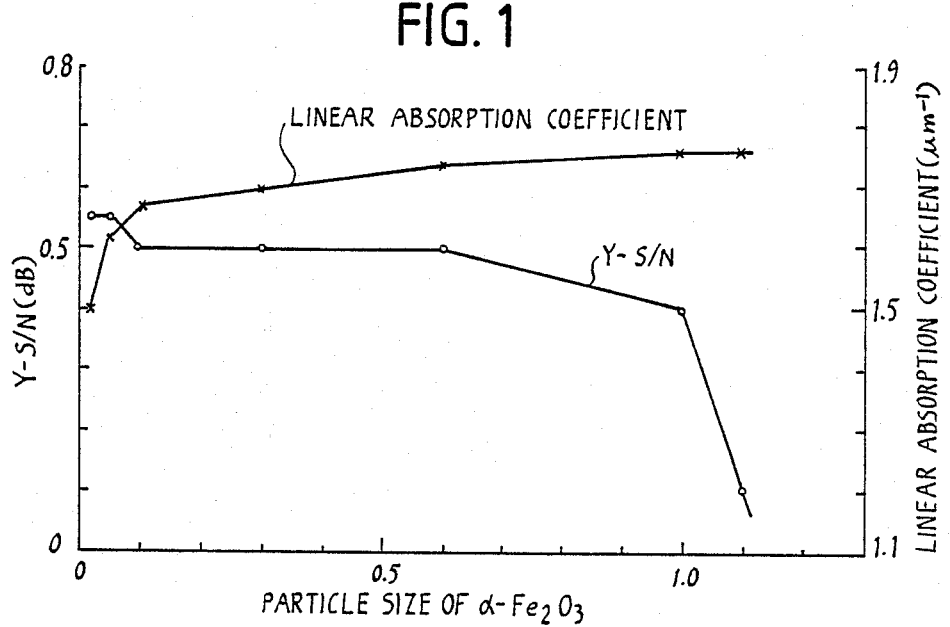
FIG. 1 is a graphical representation of a Y-S/N ratio and a linear absorption coefficient in relation to variation of a particle size of alpha-Fe$_2$O$_3$.

The magnetic recording medium of the invention is of the type which comprises a non-magnetic substrate and a magnetic recording layer formed on at least one side of the substrate. The magnetic recording layer is made of a composition which comprises a magnetic powder and a mixture of additives uniformly dispersed in a resin binder. The additives include particulate alpha-Fe$_2$O$_3$ and carbon black. Alpha-Fe$_2$O$_3$ should have an average size of from 0.05 to 1 micrometer. The reason for this is more particularly described hereinafter. Particulate alpha-Fe$_2$O$_3$ suitable for the purpose of the invention may be commercially available, for example, under the name of 180ED from Toda Kogyo Co., Ltd and is non-magnetic in nature. Particulate alpha-Fe$_2$O$_3$ is generally used in an amount of from 5 to 30 wt%, preferably from 10 to 15 wt%, of the magnetic powder contained in the magnetic recording layer.

Carbon black useful in the practice of the invention may be any carbon blacks ordinarily used in this art and may be commercially available under the designations of Ketjen Black from Akzo Cheme Co., Ltd., CSX-150A3 from Cabot Co., Ltd., XE-2 from Philips Petroleum Chemicals Co., Ltd., and the like. Carbon black has preferably an average size of 10 m$\mu$ to 100 m$\mu$ and a coloring power not less than 100 as determined by the method prescribed in D-3051-76 of ASTM. The amount of carbon black is generally in the range of from 2 to 12 wt% of the magnetic powder used. Within this range, the resulting magnetic recording medium has a good light-shielding property and an appreciable lowering of an S/N ratio by the addition of carbon black is rarely recognized.

Thus, the addition of the two types of additives to the magnetic composition enables one to make a magnetic recording medium which has a high S/N ratio and is suitable for high density recording. Moreover, the medium has a low light transmission sufficient to ensure normal operations of a medium end detector mechanism of a recording and reproducing apparatus.

The magnetic powder used in the magnetic recording layer may be made of any materials ordinarily used for these purposes. Examples of magnetic materials include ferromagnetic iron oxides such as gamma-$Fe_2O_3$ and $Fe_3O_4$ deposited with or without additional metals such as Co, Ni, Mn and the like, ferromagnetic metals such as Fe, Co, Ni and the like and the alloys thereof. Additional metals such as Al, Cr, Mn, Cu and the like may be added to the metals or alloys. Other ferromagnetic materials such as $CrO_2$ may also be used. These magnetic powders are finely divided as is well known in the art.

Useful resin binders may be any known thermoplastic and thermosetting resins used singly or in combination. Typical examples of the thermoplastic resins include vinyl chloride-vinyl acetate copolymers, vinyl chloride-vinylidene chloride copolymers, acrylic ester-styrene copolymers, methacrylic ester-styrene copolymers, acrylic ester-vinylidene chloride copolymers, methacrylic ester-vinylidene chloride copolymers, urethane elastomers, cellulose derivatives, vinyl chloride-vinyl alcohol copolymers, vinyl chloride-vinyl acetate-vinyl alcohol terpolymers, and other various synthetic rubber resins. Examples of the thermosetting resins include phenolic resins, epoxy resins, alkyd resins, silicone resins, urea-formaldehyde resins, mixtures of isocyanates and polyols, and the like. The mixing ratio of the binder and the magnetic powder is not critical and a wide range of the mixing ratio may be used in practice, but is generally used in the range of 1:3 to 1:8 on the weight basis.

Of the above resin binders, vinyl chloride-vinyl alcohol copolymers are preferred because of the good durability of the resulting magnetic layer when used in combination with particulate alpha-$Fe_2O_3$ and carbon black along with the magnetic powder. Presumably, this is because the copolymers enable the powders to be more uniformly dispersed therein. The vinyl chloride-vinyl alcohol copolymers include copolymers of vinyl chloride and vinyl alcohol with or without other copolymerizable monomers. Examples of the copolymerizable monomers include vinyl acetate, vinyl propionate, vinyl maleate and the like and, if used, are contained in an amount of from 0.5 to 2.5 wt% of the copolymer. Preferably, the vinyl alcohol should be contained in amounts not less than 8 wt%, most preferably 10 to 15 wt% of the copolymer. Within this range, the durability and electromagnetic conversion characteristics of the resulting magnetic layer are much improved.

Substrates or supports on which the magnetic recording layer is formed may be films, foils, sheets and plates of a variety of materials. Typical materials include synthetic and semi-synthetic resins such as polyesters, polyolefins, cellulose derivatives and the like, metals such as aluminum, copper and the like, glasses and ceramics.

Aside from these essential components, additives ordinarily used for these purposes may be also added to the magnetic composition in amounts not impeding the effects of the essential components. The additives may include lubricants, dispersants, surface active agents, and the like.

For the fabrication of the magnetic recording medium according to the invention, a resin binder, a magnetic powder, particulate alpha-$Fe_2O_3$ and carbon black in predetermined amounts and arbitrary additives are mixed in a solvent for the resin binder in a mixer or blender such as a sand mill, thereby preparing a magnetic paint. The magnetic paint is coated onto a substrate in a dry thickness, for example, of from 4 to 8 micrometers and dried. If the substrate is a film such as a polyester film, the applied film is dried, calendered and slit to 0.5 inch wide tapes.

The solvent for the resin binder may be alcohols such as methanol, ethanol and the like, aromatic compounds such as xylene, toluene, benzene and the like, ketones such as acetone, methyl ethyl ketone, methyl isobutyl ketone and the like, and mixtures thereof. Usually, mixed solvents as described in the examples are used.

The present invention is more particularly described by way of examples.

EXAMPLE 1

One hundred parts by weight of Co-containing gamma-$Fe_2O_3$ having a specific surface area of 30 m$^2$/g as determined by the BET method, 10 parts by weight of vinyl chloride-vinyl acetate copolymer, 10 parts by weight of a polyurethane resin, 10 parts by weight of particulate alpha-$Fe_2O_3$ having an average size of about 0.3 micrometers, 8 parts by weight of carbon black having a coloring power of 120 as determined by the method prescribed in ASTM, and 230 parts by weight of a mixed solvent of equal amounts of methyl ethyl ketone, toluene and methyl isobutyl ketone were mixed in a sand mill for 24 hours to obtain a magnetic paint. Ten parts by weight of an isocyanate curing agent was added to the magnetic paint and uniformly mixed. Thereafter, the paint was applied onto a polyester film in a dry thickness of 4 to 8 micrometers, followed by calendering to make a smooth surface and heating to 35° C. for 90 hours for curing and slitting to ½ inch wide magnetic video tapes.

EXAMPLE 2

The general procedure of Example 1 was repeated except that particulate alpha-$Fe_2O_3$ having an average size of about 0.6 micrometers was used instead of the particulate alpha-$Fe_2O_3$ having an average size of about 0.3 micrometers, thereby obtaining magnetic video tapes.

EXAMPLE 3

The general procedure of Example 1 was repeated except that 20 parts by weight of particulate alpha-$Fe_2O_3$ was used, thereby obtaining magnetic video tapes.

EXAMPLE 4

The general procedure of Example 1 was repeated using carbon black having a coloring power of 105, thereby obtaining magnetic video tapes.

EXAMPLE 5

The general procedure of Example 1 was repeated using 4 parts by weight of the carbon black instead of 8 parts by weight, thereby obtaining magnetic video tapes.

EXAMPLE 6

The general procedure of Example 1 was repeated using particulate alpha-$Fe_2O_3$ having different average sizes not larger than 1.1 micrometers, inclusive, thereby obtaining magnetic video tapes.

EXAMPLE 7

The general procedure of Example 1 was repeated using different amounts of alpha-$Fe_2O_3$ not larger than 40 parts by weight, inclusive, thereby obtaining magnetic video tapes.

EXAMPLE 8

The general procedure of Example 1 was repeated using different amounts of carbon black not larger than 14 parts by weight, inclusive, thereby obtaining magnetic video tapes.

EXAMPLE 9

The general procedure of Example 1 was repeated using different coloring powers of carbon black ranging from 60 to 140, thereby obtaining magnetic video tapes.

Comparative Example 1

The general procedure of Example 1 was repeated except that particulate alpha-$Fe_2O_3$ was not used, but the amount of carbon black was changed from 8 parts by weight to 15 parts by weight, thereby obtaining magnetic video tapes.

Comparative Example 2

The general procedure of Example 1 was repeated except that carbon black was not used, but particulate alpha-$Fe_2O_3$ was increased from 10 parts by weight to 40 parts by weight, thereby obtaining magnetic video tapes.

Comparative Example 3

The general procedure of Example 1 was repeated except that acicular alpha-$Fe_2O_3$ having an average major length of 0.8 micrometers and a ratio of major and minor lengths of about 5 was used in the same amount as particulate alpha-$Fe_2O_3$ having an average size of 0.3 micrometers, thereby obtaining magnetic video tapes.

The video tapes obtained in Examples 1 through 9 and Comparative Examples 1 through 3 were subjected to measurements of electromagnetic conversion characteristics of Y-S/N and C-S/N ratios, a light-shielding property, i,e. a linear absorption coefficient, and durability of the magnetic layer. The results are shown in Table 1.

The above measurements were effected as follows.

Y-S/N ratio: each disc was subjected to a one-hour still reproduction test, in which a Y signal-to-noise ratio at gray 50 IRE recorded at a given position was measured and is indicated as a comparison to the ratio of the tape of Comparative Example 1.

C-S/N: chrominance S/N was measured by the use of an instrument, TG-7, by Shibasoku Co., Ltd., and each measurement was compared with a chrominance S/N of the tape of Comparative Example 1 by the use of a U 706 unit.

Linear absorption coefficient: an autographic recording spectrophotometer was used to measure a linear absorption coefficient of each tape at a wavelength of 8000 angstrom.

Durability: each tape was subjected to frame freezing or still reproduction for 2 hours at $-8°$ C. and defects on the magnetic layer were visually observed and evaluated as follows. A: free of any defects, B: fine and slight defects, C: deep, clear defects, D: defects of such a degree that reproduction is not possible with an output being faded away during the reproduction operation.

TABLE 1

|  | Y-S/N (dB) | C-S/N (dB) | Linear Absorption Coefficient ($\mu m^{-1}$) | Durability |
|---|---|---|---|---|
| Example |  |  |  |  |
| 1 | 0.5 | 1.1 | 1.70 | B |
| 2 | 0.5 | 1.0 | 1.74 | B |
| 3 | 0.4 | 0.8 | 1.78 | B |
| 4 | 0.5 | 1.0 | 1.68 | B |
| 5 | 0.6 | 1.1 | 1.65 | B |
| Com. Ex. |  |  |  |  |
| 1 | 0 | 0 | 1.50 | D |
| 2 | 0.3 | 0.8 | 1.21 | B |
| 3 | 0.5 | 0.8 | 1.27 | C |

As will be apparent from the above results, the video tapes of Examples of the invention are improved over the tape of Comparative Example 1 by 0.4 to 0.5 dB with respect to Y-S/N and by 0.8 to 1.1 dB with respect to C-S/N. Moreover, the linear absorption coefficient is also improved. As compared with the tape of Comparative Example 2, the Y-S/N and C-S/N ratios are improved with a much improved light-shielding property. Furthermore, the tapes of the invention are approximately equal to the tape of Comparative Example 3 with respect to the S/N ratios, but are significantly improved with respect to the light-shielding property. The use of particulate alpha-$Fe_2O_3$ and carbon black in combination is effective in improving the electromagnetic conversion characteristics and the light-shielding property.

The tapes of Example 6 were used to determine the Y-S/N ratio and the linear absorption coefficient in relation to the size of particulate alpha-$Fe_2O_3$. The results are shown in FIG. 1, revealing that if the average size is smaller than 0.05 micrometers, the linear absorption coefficient becomes small with a lowering of light-shielding property. On the other hand, when the average size exceeds 1 micrometer, the Y-S/N ratio sharply lowers. Thus, the average size should be in the range of from 0.05 to 1 micrometer.

Figure 2:
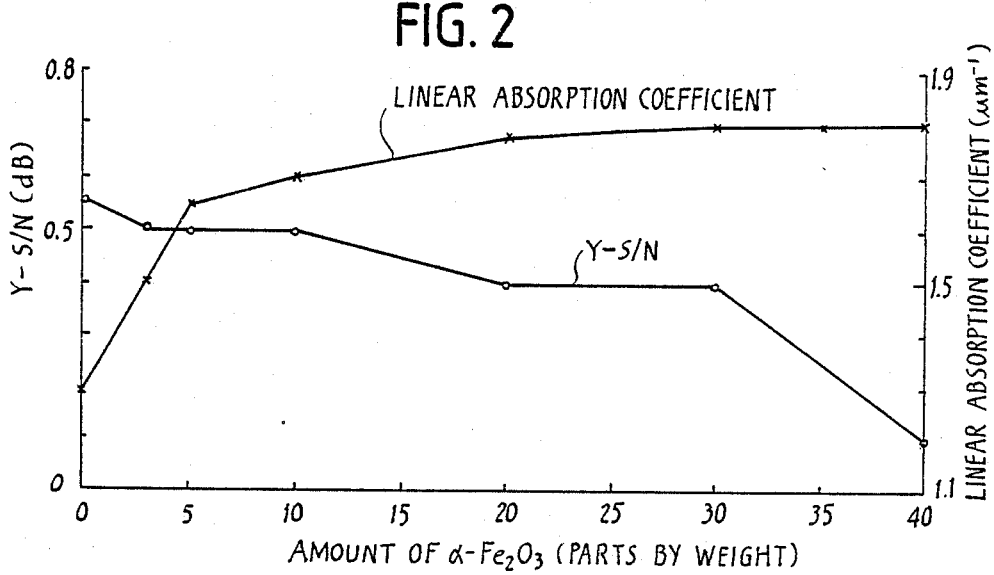
FIG. 2 is a graphical representation of a Y-S/N ratio and a linear absorption coefficient in relation to variation of an amount of alpha-Fe$_2$O$_3$.

Similarly, the Y-S/N ratio and the linear absorption coefficient relative to the amount of particulate alpha-$Fe_2O_3$ are shown in FIG. 2. From the figure, it will be seen that when the amount is less than 5 wt% of the magnetic powder, the linear absorption coefficient becomes too low. On the other hand, when the amount exceeds 30 wt% of the magnetic powder, the Y-S/N ratio lowers significantly. Thus, the amount of particulate alpha-$Fe_2O_3$ is in the range of from 5 to 30 wt% of the magnetic powder.

Figure 3:
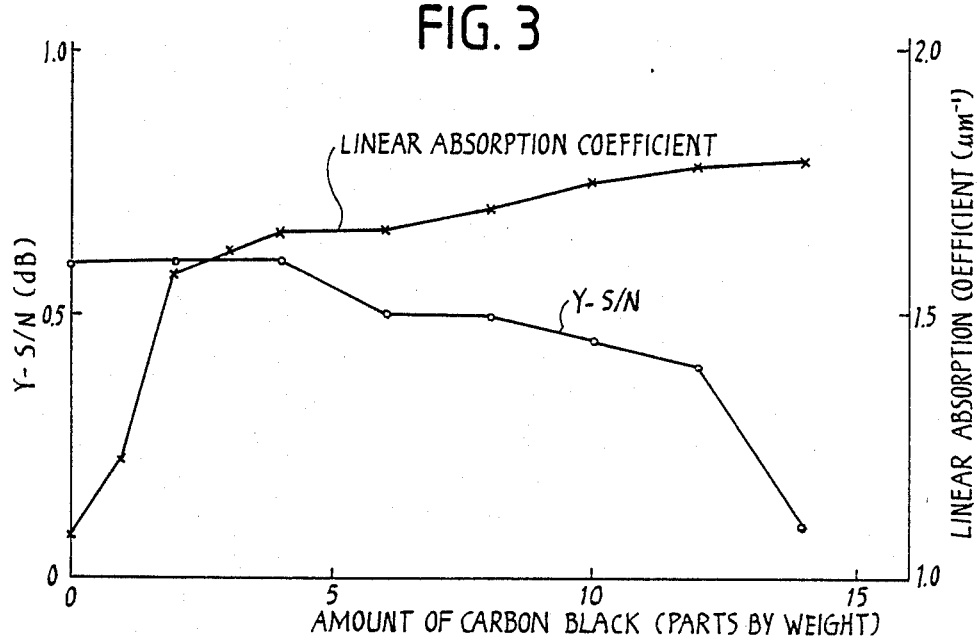
FIG. 3 is a graphical representation of a Y-S/N ratio and a linear absorption coefficient in relation to variation of an amount of carbon black for a given amount of alpha-Fe$_2$O$_3$.

The Y-S/N ratio and the linear absorption coefficient relative to the amount of carbon black are shown in FIG. 3. The figure reveals that when the amount is less than 2 wt% of the magnetic powder, the linear absorption coefficient becomes too low. With the amount exceeding 12 wt%, the Y-S/N ratio becomes very low. Thus, the amount of carbon black is in the range of from 2 to 12 wt% of the magnetic powder.

Figure 4:
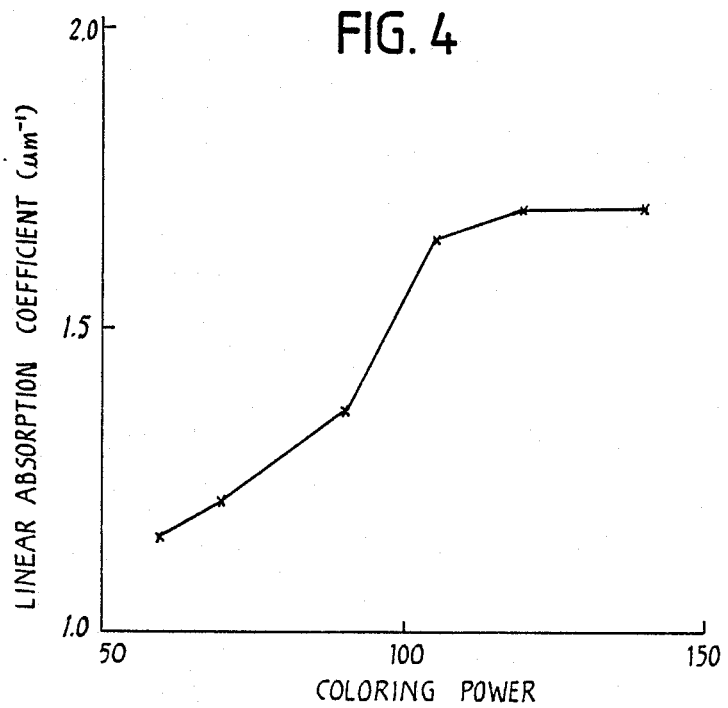
FIG. 4 is a graphical representation of a linear absorption coefficient in relation to variation of a coloring power of carbon black.

The relationship between the linear absorption coefficient and the coloring power of carbon black is shown in FIG. 4. The figure reveals that when the coloring power is less than 100, the linear absorption coefficient lowers abruptly. Thus, the coloring power is preferred to be over 100.

EXAMPLE 10

One hundred parts by weight of Co-containing gamma-$Fe_2O_3$ having a specific surface area of 30 $m^2/g$ as determined by the BET method, 10 parts by weight of vinyl chloride-vinyl alcohol-vinyl acetate copolymer having a vinyl alcohol content of 10 wt%, 10 parts by weight of a polyurethane resin, 10 parts by weight of particulate alpha-$Fe_2O_3$ having an average size of about 0.3 micrometers, 8 parts by weight of carbon black having a coloring power of 120 as determined by the method prescribed in ASTM, and 230 parts by weight of a mixed solvent of equal amounts of methyl ethyl ketone, toluene and methyl isobutyl ketone were mixed in a sand mill for 24 hours to obtain a magnetic paint. Ten parts by weight of an isocyanate curing agent was added to the magnetic paint and uniformly mixed. Thereafter, the paint was applied onto a polyester film in a dry thickness of 4 to 8 micrometers, followed by calendering to make a smooth surface and heating to 35° C. for 90 hours for curing and slitting to ½ inch wide magnetic video tapes.

EXAMPLE 11

The general procedure of Example 10 was repeated except that particulate alpha-$Fe_2O_3$ having an average size of about 0.6 micrometers was used, thereby obtaining magnetic video tapes.

EXAMPLE 12

The general procedure of Example 10 was repeated except that 20 parts by weight of particulate alpha-$Fe_2O_3$ was used, thereby obtaining magnetic video tapes.

EXAMPLE 13

The general procedure of Example 10 was repeated using carbon black having a coloring power of 105, thereby obtaining magnetic video tapes.

EXAMPLE 14

The general procedure of Example 10 was repeated using 4 parts by weight of the carbon black instead of 8 parts by weight, thereby obtaining magnetic video tapes.

EXAMPLE 15

The general procedure of example 10 was repeated using a vinyl chloride-vinyl alcohol-vinyl acetate having a content of vinyl alcohol of 15 wt%, thereby obtaining magnetic video tapes.

EXAMPLE 16

The general procedure of Example 10 was repeated using particulate alpha-$Fe_2O_3$ having different average sizes not larger than 1.1 micrometers, inclusive, thereby obtaining magnetic video tapes.

EXAMPLE 17

The general procedure of Example 10 was repeated using different amounts of alpha-$Fe_2O_3$ not larger than 40 parts by weight, inclusive, thereby obtaining magnetic video tapes.

EXAMPLE 18

The general procedure of Example 10 was repeated using different amounts of carbon black not larger than 14 parts by weight, inclusive, thereby obtaining magnetic video tapes.

EXAMPLE 19

The general procedure of Example 10 was repeated using different coloring powers of carbon black ranging from 60 to 140, thereby obtaining magnetic video tapes.

EXAMPLE 20

The general procedure of Example 10 was repeated using vinyl chloride-vinyl alcohol-vinyl acetate copolymers having contents of vinyl alcohol of 2, 4, 6, 8, 10, 12, 14, 16, 18 and 20 wt%, thereby obtaining magnetic video tapes.

Comparative Example 4

The general procedure of Example 10 was repeated except that particulate alpha-$Fe_2O_3$ was not used, but the amount of carbon black was changed to 15 parts by weight, thereby obtaining magnetic video tapes.

Comparative Example 5

The general procedure of Example 10 was repeated except that carbon black was not used, but particulate alpha-$Fe_2O_3$ was increased to 40 parts by weight, thereby obtaining magnetic video tapes.

Comparative Example 6

The general procedure of Example 10 was repeated except that acicular alpha-$Fe_2O_3$ having an average major length of 0.8 micrometers and a ratio of major and minor lengths of about 5 was used in the same amount as the particulate alpha-$Fe_2O_3$, thereby obtaining magnetic video tapes.

Comparative Example 7

The general procedure of Example 10 was repeated except that the particulate alpha-$Fe_2O_3$ was replaced by $Cr_2O_3$ having an average size of 0.3 micrometers, thereby obtaining magnetic video tapes.

Comparative Example 8

The general procedure of Example 10 was repeated except that the particulate alpha-$Fe_2O_3$ was replaced by $Al_2O_3$ having an average size of 0.3 micrometers, thereby obtaining magnetic video tapes.

The magnetic tapes obtained in Examples 10 through 20 and Comparative Examples 4 through 8 were subjected to measurements in the same manner as in the foregoing examples. The results are shown in Table 2 and FIGS. 5 through 8.

TABLE 2

| | Y-S/N (dB) | Linear Absorption Coefficient ($\mu m^{-1}$) | Durability |
|---|---|---|---|
| Example | | | |
| 10 | 0.7 | 1.69 | A |
| 11 | 0.7 | 1.74 | A |
| 12 | 0.6 | 1.80 | A |
| 13 | 0.7 | 1.65 | A |
| 14 | 0.8 | 1.65 | A |
| 15 | 0.8 | 1.71 | A |
| Com. Ex. | | | |
| 4 | 0.0 | 1.43 | D |
| 5 | 0.5 | 1.20 | C |
| 6 | 0.7 | 1.24 | D |
| 7 | 0.4 | 1.18 | B |
| 8 | 0.4 | 1.16 | B |

The magnetic tape of Examples 10 to 15 are better than the tape of Comparative Example 4 with respect to Y-S/N ratio and light-shielding property, with much better durability.

As compared with the tape of Comparative Example 5, the light-shielding property and durability are greatly improved. Likewise, the light-shielding property and the durability are better than those properties of the magnetic tape of Comparative Example 6 where acicular alpha-Fe$_2$O$_3$ was used.

When compared with the tapes of Comparative Examples 7 and 8 where chromium oxide and aluminum oxide are, respectively, used, the Y-S/N ratio is improved and the light-shielding property is significantly improved with better durability of the magnetic layer.

The comparison between the tapes of Examples 1 to 5 and Examples 10 to 15 reveals that the tapes using vinyl chloride-vinyl alcohol-vinyl acetate copolymers used as the binder are superior in Y-S/N ratio and durability to the tapes of Examples 1 to 5 though the linear absorption coefficient is rarely improved. In Examples 10 to 15, vinyl chloride-vinyl alcohol-vinyl acetate terpolymers are used, but similar results are obtained when using other types of vinyl chloride-vinyl alcohol copolymers.

Figure 5:
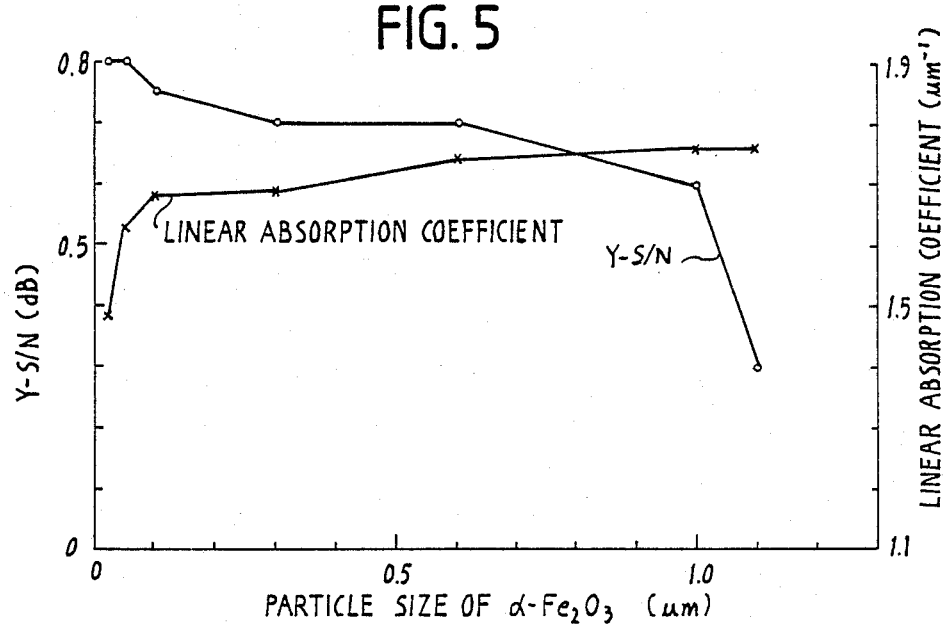
FIGS. 5 through 8 are similar to FIGS. 1 through 4, respectively, but a specific type of resin binder is used for dispersing alpha-Fe$_2$O$_3$ and carbon black.

The tapes of Example 16 were used to determine the Y-S/N ratio and the linear absorption coefficient in relation to the size of particulate alpha-Fe$_2$O$_3$. The results are shown in FIG. 5, revealing that when the average size is smaller than 0.05 micrometers, the linear absorption coefficient becomes small with a lowering of the light-shielding property. On the other hand, when the average size exceeds 1 micrometer, the Y-S/N ratio lowers sharply. This tendency is similar to that of FIG. 1, but the Y-S/N ratio is higher than in the case of FIG. 1.

Figure 6:
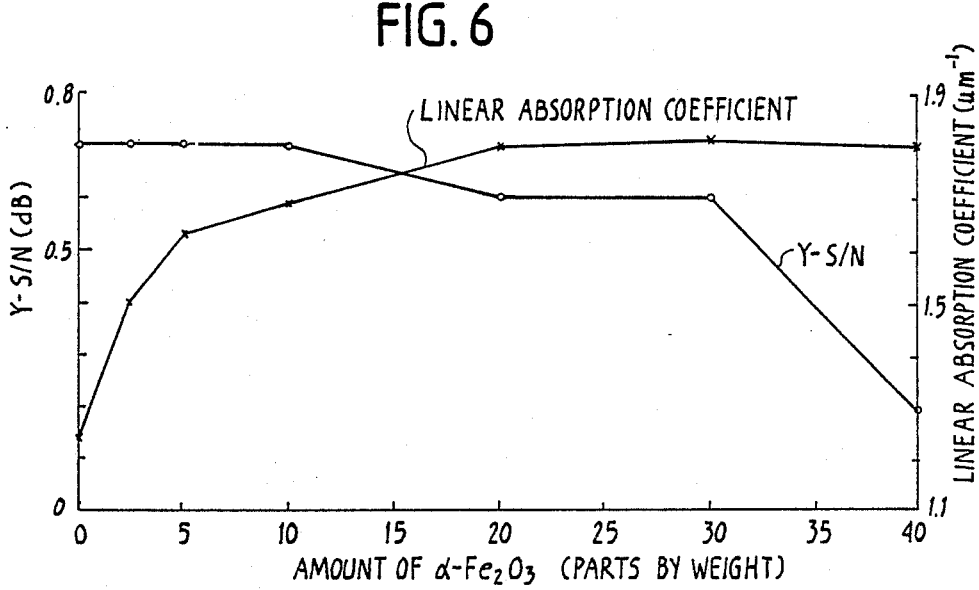

The Y-S/N ratio and the linear absorption coefficient relative to the amount of particulate alpha-Fe$_2$O$_3$ are shown in FIG. 6. These results are similar to those of FIG. 2 but the Y-S/N ratio is higher when using the specific type of copolymer.

Figure 7:
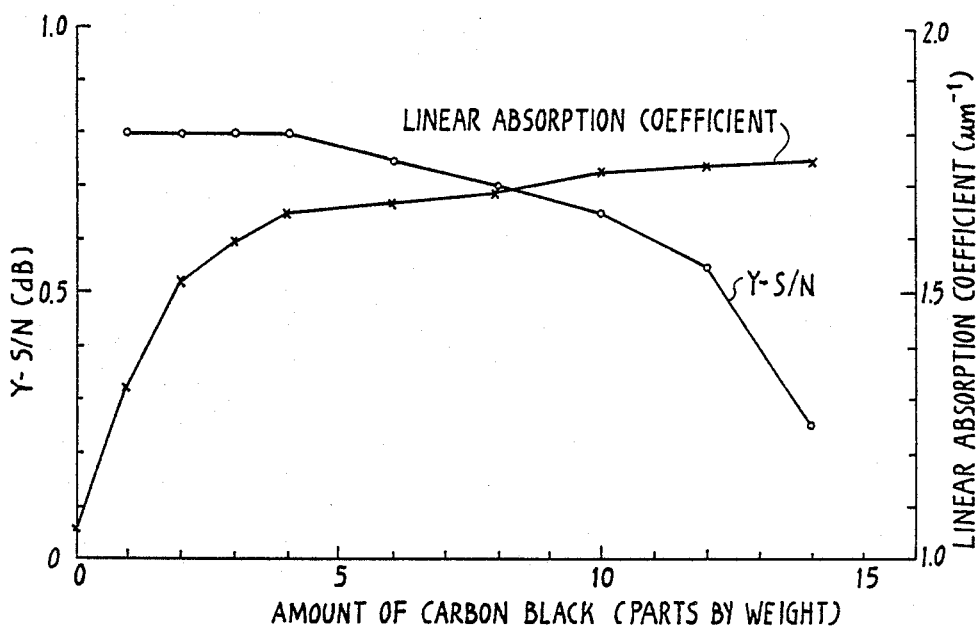

The Y-S/N ratio and the linear absorption coefficient relative to the amount of carbon black are shown in FIG. 7. This figure reveals that when the amount is less than 2 wt% of the magnetic powder, the linear absorption coefficient becomes too low. With the amount exceeding 12 wt%, the Y-S/N ratio becomes sharply low. Thus, the amount of carbon black is also confirmed to be in the range of from 2 to 12 wt% of the magnetic powder.

Figure 8:
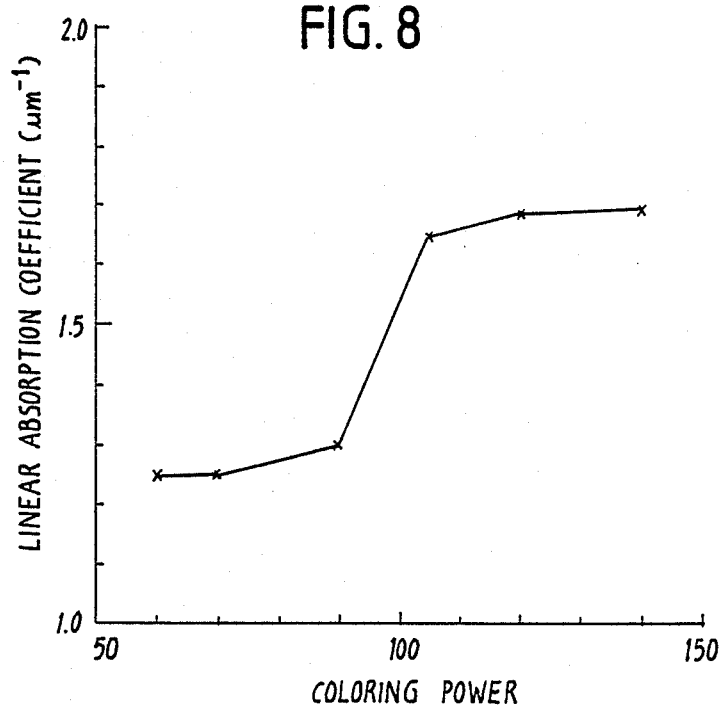

The relationship between the linear absorption coefficient and the coloring power of carbon black is shown in FIG. 8. The figure reveals that when the coloring power is less than 100, the linear absorption coefficient lowers abruptly similar to the case of FIG. 4.

The results of Example 20 where the content of vinyl alcohol is changed reveal that when the content is 6 wt% or lower, the durability is evaluated as B and is preferred to be 8 wt% or higher.

As will be apparent from the above results, vinyl chloride-vinyl alcohol copolymers are superior to other types of resins when used in combination with particulate alpha-Fe$_2$O$_3$ and carbon black additives.

What is claimed is:

1. A magnetic recording medium comprising a non-magnetic substrate and a magnetic recording layer formed on at least one side of said substrate, said magnetic recording layer being made of a composition which comprises a vinyl chloride-vinyl alcohol copolymer binder uniformly dispersing therein a magnetic powder, from 10 to 15 wt% of particulate alpha-Fe$_2$O$_3$ having an average size of from 0.05 to 1 micrometer and from 2 to 12 wt% of carbon black, each based on the magnetic powder.

2. A magnetic recording medium according to claim 1, wherein said carbon black has a coloring power not smaller than 100 when determined by the method prescribed in ASTM.

3. A magnetic recording medium according to claim 1, wherein said vinyl chloride-vinyl alcohol copolymer has a content of vinyl alcohol not less than 8 wt%.

4. A magnetic recording medium according to claim 1, wherein said vinyl chloride-vinyl alcohol copolymer comprises vinyl chloride, vinyl alcohol and other copolymerizable monomer.

5. A magnetic recording medium according to claim 4, wherein said vinyl chloride-vinyl alcohol copolymer is a vinyl chloride-vinyl alcohol-vinyl acetate terpolymer.

6. A magnetic recording medium according to claim 1, wherein the vinyl chloride-vinyl alcohol copolymer binder comprises not less than 8 weight percent vinyl alcohol.

7. A magnetic recording medium according to claim 1, wherein the vinyl chloride-vinyl alcohol copolymer binder comprises 10 to 15 weight percent vinyl alcohol.

* * * * *